United States Patent [19]

Flueter et al.

[11] Patent Number: 5,003,460
[45] Date of Patent: Mar. 26, 1991

[54] METHOD FOR THE TRANSMISSION OF CONNECTION DATA STORED IN A COMMUNICATION SWITCHING SYSTEM TO A DATA PROCESSING SYSTEM

[75] Inventors: Heribert Flueter; Hinrich Schumacher, both of Munich, Fed. Rep. of Germany

[73] Assignee: Siemens Aktiengesellschaft, Berlin and Munich, Fed. Rep. of Germany

[21] Appl. No.: 238,700

[22] Filed: Aug. 31, 1988

[30] Foreign Application Priority Data

Sep. 8, 1987 [DE] Fed. Rep. of Germany ....... 3730106

[51] Int. Cl.[5] .............................................. G06F 13/38
[52] U.S. Cl. ................................ 364/200; 364/240.9; 364/245.7; 364/238.1; 364/229.1
[58] Field of Search ....................... 340/825.02, 825.03

[56] References Cited

U.S. PATENT DOCUMENTS

| | | | |
|---|---|---|---|
| 4,404,628 | 9/1983 | Angelo | 364/200 |
| 4,646,300 | 2/1987 | Goodman et al. | 364/200 X |
| 4,692,862 | 9/1987 | cousin et al. | 364/200 |

OTHER PUBLICATIONS

Siemens Review (1977) No. 7 entitled, "The Structure of the Siemens EDS System", pp. 295-301.
Siemens-Zeitschrift 51 (1977) Heft 2, entitled, "Struktur des Siemens-Systems EDS", pp. 82-87.
R. V. Decker's Verlag, G. Schenck, Heidelberg, Hamburg 1978, entitled, Datenvermittlungs-technik (EDS), pp. 232-242.
Heidelberger Taschenbucher, Datenfernverarbeitung, H. Hofer, Springer-Verlag, Berlin, Heidelberg, New York 1978, pp. 128-133.

*Primary Examiner*—Thomas M. Heckler
*Attorney, Agent, or Firm*—Jeffrey P. Morris

[57] ABSTRACT

In an intermediate storage of a communication switching system, where connection data are stored in connection-specific data sets, the intermediate storage is continuously checked for the presence of data sets. If at least one such data set is present, then this data set is transmitted in a security transmission method to two separate processing units of a data processing system and written into a memory unit. If only one of two processing units acknowledges error-free reception of a data set, then this processing unit is supplied with a control signal by the communication switching system directing it to copy the data set just received into the memory unit of the other processing unit.

10 Claims, 3 Drawing Sheets

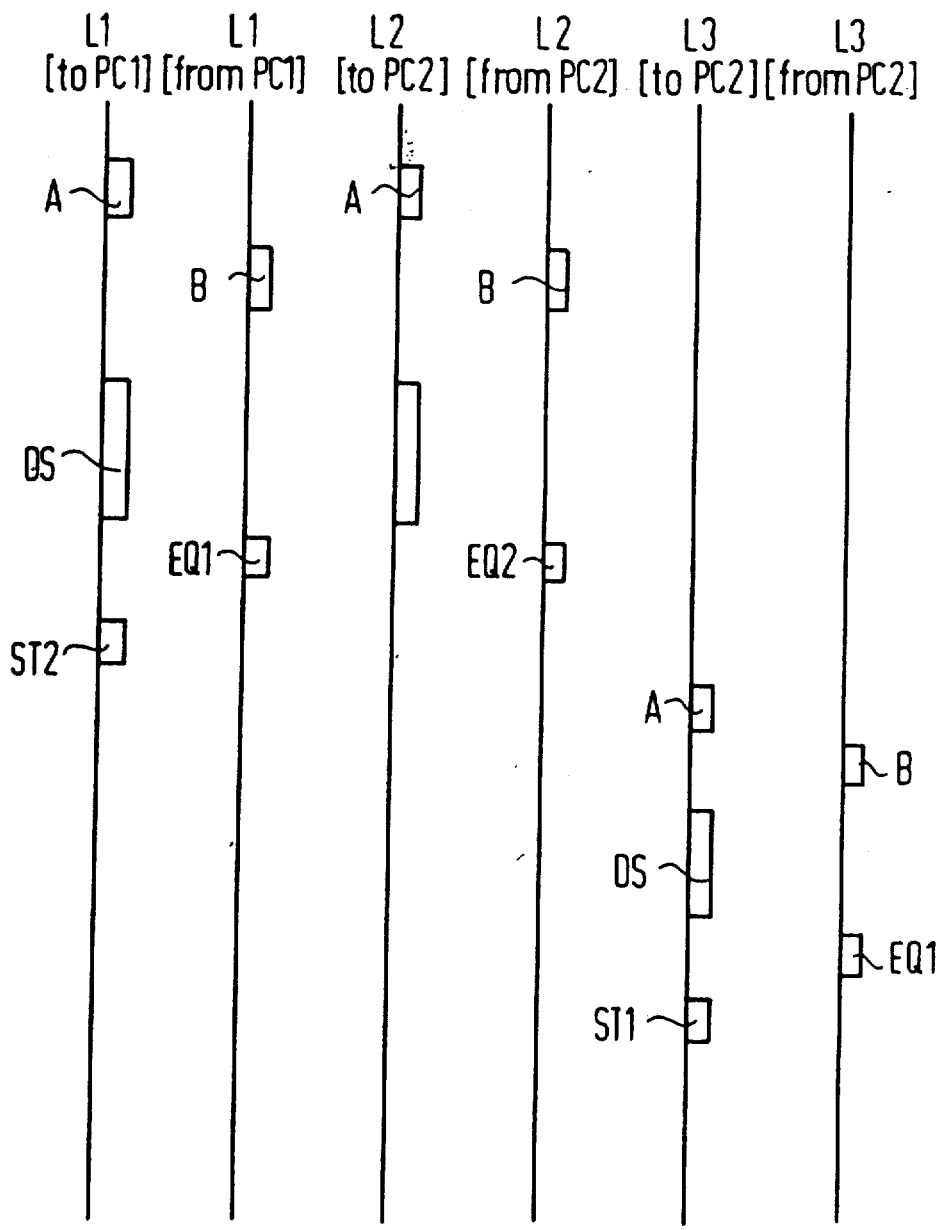

METHOD FOR THE TRANSMISSION OF CONNECTION DATA STORED IN A COMMUNICATION SWITCHING SYSTEM TO A DATA PROCESSING SYSTEM

BACKGROUND OF THE INVENTION

1. Field of the Invention

The present invention relates generally to a method for the transmission of data corresponding to connections extending through a communication switching system, and in particular to a communication switching system in which data for each connection are placed in intermediary storage in data sets specific to each connection, and are redundantly transmitted to a data processing system connected to the communication switching system.

2. Description of the Prior Art

It is known in the prior art in Der Dienst bei der Deutschen Bundespost, Teilband 4, Datenvermittlungstechnik (EDS), R. V. Decker's Verlag G. Schenk, Heidelberg, Hamburg 1978, pages 232 to 242 to determine call data in a communication switching system for each of the connections going through and to place such call data in intermediate storage. These call data function, for example, to determine fees for the individual connections respectively for the detection of traffic intensity. To determine the call data in each connection set-up, a "begin set" is prepared, in which, apart from an identification of the subscriber wanting the particular connection (calling party), the dial data identifying the wanted subscriber (called party) and information regarding the time from which payment of a fee is counted as well as the type of fee accounting are stored. When disconnecting the particular call, an end set is prepared which, apart from the identification of the calling subscriber, contains data identifying the time the obligation for payment of the fee ends.

Begin and end sets are transmitted in each instance separately to an output buffer and remain there until the buffer is completely filled. Once the output buffer is filled, the begin and end sets stored in the buffer are transferred to a disk memory of the data switching system. For further processing of the begin and end sets, such call data are transmitted to a computer. For this transmission, a data transmission procedure is provided.

It is also known by Heidelberger Taschenbuecher, Datafernverarbeitung, H. Hofer, Springer-Verlag, Berlin, Heidelberg, New York 1978, pages 128 to 133 that for transmission of data blocks from a data station to an external site, the data station first supplies a request signal to the external site. The external site responds with a positive reply if it is ready to receive data. Upon receipt of this response message, the transmission of a data block takes place. Receipt of the data block is confirmed by the external site by the output of an acknowledge signal which provides information regarding the receipt of the data block.

It is an object of the present invention to provide a method to permit, with minimum control effort in the communication switching system, reliable transmission of data identifying the connections to a data processing system.

SUMMARY OF THE INVENTION

The invention provides that data sets originating in a communication switching system can be continuously transmitted to a data processing system so that a relatively small temporary storage in the communication switching system can be used. For such temporary storage, a fixed area of the memory of a memory-programmed communication switching system can be used. The invention also provides that the data sets are redundantly stored in the data processing system in independent memory units, and that individual data sets are transmitted from the communication switching system via separate transmission paths to two processing units of the data processing system (also independent of each other). Upon failure of one of the transmission paths or due to the failure of one of the processing units, transmission of data sets can still be made to the processing unit not affected by such failure. For example, when one processing unit becomes inoperative, the transmitted data sets can, subsequently, without any involvement by the communication switching system, be stored in the inoperative unit. The processing unit not affected by a failure simply copies the data set just received into the other processing unit after it is returned to service.

BRIEF DESCRIPTION OF THE DRAWINGS

FIGS. 2 and 3 show timing diagrams useful in explaining the invention illustrated in FIG. 1.

DESCRIPTION OF THE PREFERRED EMBODIMENT

Figure 1:
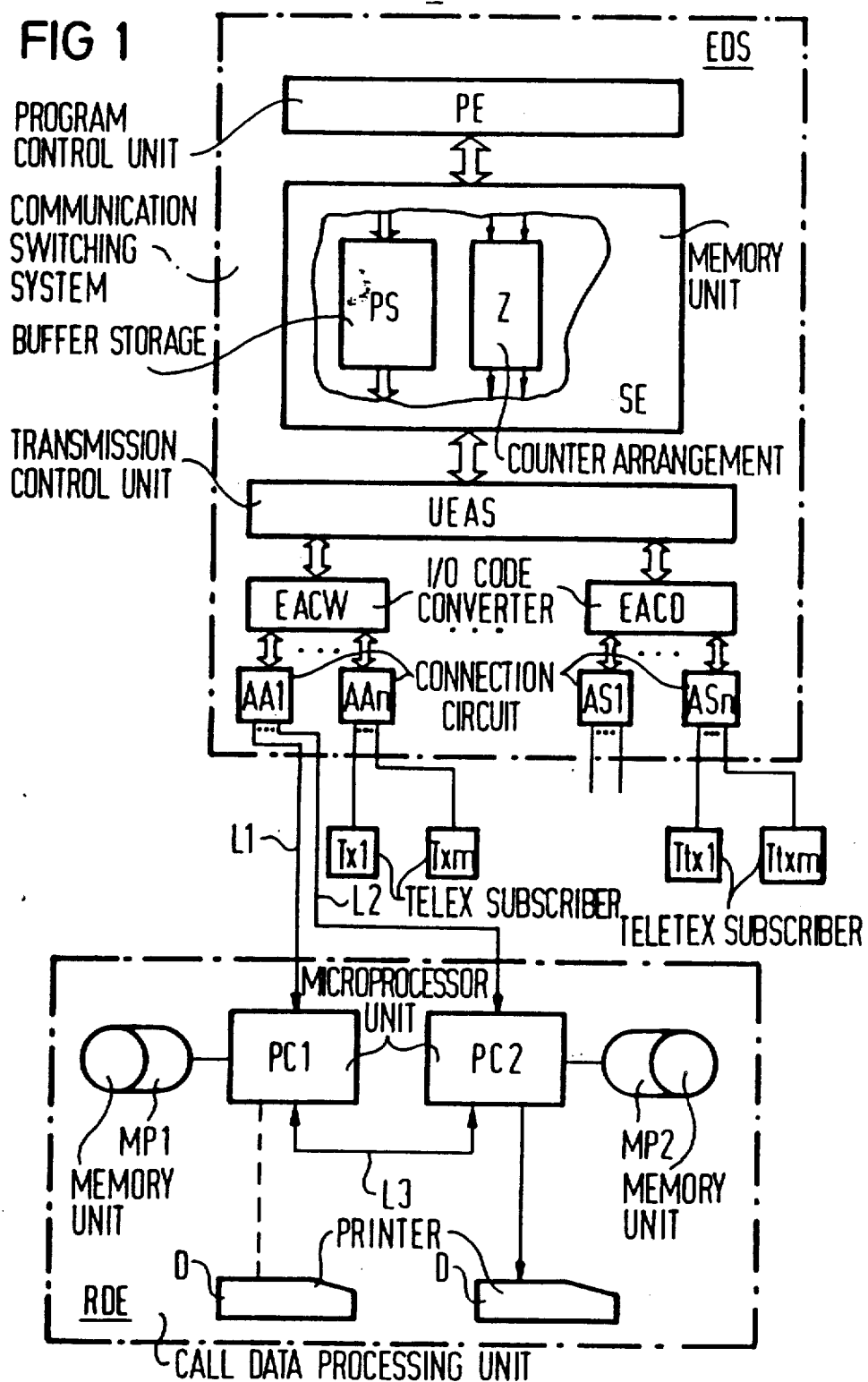
FIG. 1 shows a communication switching system constructed in accordance with the present invention.

Referring to FIG. 1, an EDS communication switching system is shown which functions for the switching of data signals. Among these data signals are, for example, telex signals or voice signals in digitally encoded form. In the communication switching system two different groups of connecting circuits are shown. The first group comprises the connecting circuits AA1 bis AAn of which only the connecting circuits AA1 and AAn are illustrated. These connecting circuits AA1 to AAn process digital data signals which have been transmitted in an asynchronous transmission mode. Conventional telex devices such as telex subscriber end devices Tx1 to Txm are connectable to these connecting circuits AA1 to AAn. In FIG. 1, telex subscriber end devices Tx1 to Txm are connected with connecting circuit AAn.

The second group of connecting circuits comprises the connecting circuits AS1 to ASn. Of these, only the connecting circuits AS1 and ASn are illustrated in FIG. 1. These connecting circuits AS1 to ASn process digital data signals in the form of digital bit groups (envelopes) which are transmitted in a synchronous transmission mode. For example, these connecting circuits AS1 to ASn can output and receive digital data signals in accordance with the International Alphabet IA No. 5. For example, office telex end devices, also called teletex subscriber end devices, can, be connected to these connecting circuits AS1 to ASn. In FIG. 1 teletex subscriber end devices Ttx1 to Ttxm are connected to connecting circuit ASn.

Regarding the aforementioned connecting circuits AA1 to AAn and AS1 to ASn, respectively, it is pointed out that they are in each instance connected to a large number of transmission lines, which can be used as subscriber lines for connection of, for example, telex subscriber terminals, teletex subscriber terminals, or as exchange connection lines over which two communication switching systems may be connected to each other.

Apart from the aforementioned connecting circuit, the circuit parts of the EDS communication switching system have I/O code converters EACD and EACW connected to the connecting circuits AA1 to AAn and AS1 to ASn, respectively, a transmission control UEAS, a memory unit SE and, lastly, a program control unit PE. The interaction of these circuit parts will not be described here in detail, since this is already well known (see, for example "Siemens-Zeitschrift", No. 2, 1977, pages 82 to 87).

For the explanation of the method according to the present invention only buffer storage PS and controllable counter arrangement Z are shown in the memory unit SE.

A call data processing system RDE is connected to the connecting circuit AA1 via two transmission lines L1 and L2. These transmission lines L1 and L2 are used as dedicated lines. The call data processing system RDE has two microprocessor units PC1 and PC2, which are independent of each other, each of which are connected to one of the aforementioned transmission lines L1 and L2. Each of the microprocessor units PC1 and PC2, which, for example can be a personal computer, have an external memory unit MP1 and MP2 respectively. These memory units MP1 and MP2 can be, for example, magnetic disk storage devices. In FIG. 1 the memory unit associated with the microprocessor unit PC1 is referred to as MP1. The memory unit connected to the microprocessor unit PC2 is referred to as MP2.

The aforementioned microprocessor units PC1 and PC2 are interconnected via a connecting line L3. In addition, an output device, in the form of a printer D can be connected to each of the microprocessor units MP1 and MP2. The method according to the present invention will be explained in greater detail with reference to FIG. 2 and FIG. 3.

Figure 2:
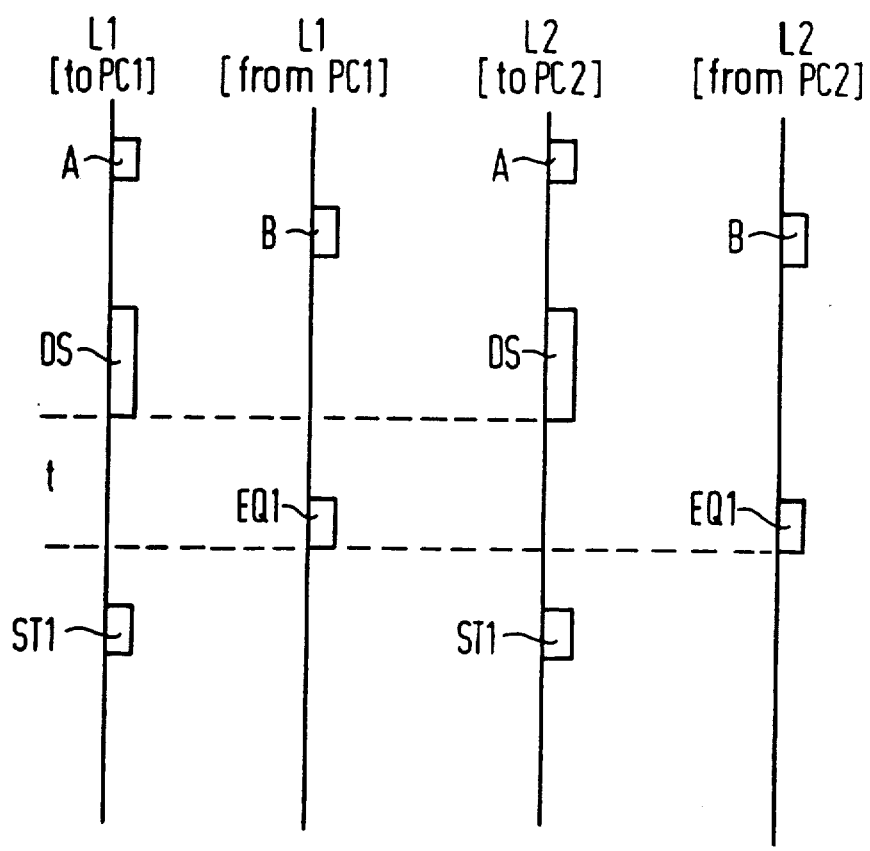

The EDS communication switching system prepares for each of the connections established by way of it a data set under the control of the program control unit PE, which contains the data for the subsequent determination of fees and, optionally, traffic statistics. The individual data sets are transmitted in the sequence in which they were stored into the buffer memory PS. This buffer memory PS is continuously monitored with respect to the presence of stored data sets. Referring now to FIG. 2, one can ascertain that each transmission line L1 and L2 and the connecting line L3 contains two unidirectional lines for transmitting input and output signals, respectively. If at least one data set is present in the buffer memory PS, the EDS communication switching system, under the control of the program control unit PE, transmits a request signal A on the dedicated lines L1 and L2 to the microprocessor units PC1 and PC2 (FIG. 1) of the call data processing system RDE. Such a request signal is, as are the signals transmitted on the two dedicated lines, formed by a fixed bit sequence.

The two microprocessor units PC1 and PC2 upon their readiness to receive a data set, which here is assumed to be applicable to both, output a ready message signal B. Following the arrival of this ready message signal B, the data set in the buffer memory PS next in line to be transmitted is copied in the communication switching system EDS and transmitted to the two microprocessor units PC1 and PC2 as signal DS. The two microprocessor units PC1 and PC2, thereupon, check the data set DS just received with respect to error-free transmission. It is assumed that error-check characters are added to the data set DS by the communication switching system security data. There are different methods known for checking transmitted data signals in conjunction with security data. For example, safeguarding methods using parity bits or block security methods may be used. Following the aforementioned check of the received data set DS in the two microprocessor units PC1 and PC2, the microprocessor units PC1 and PC2 store the particular data set in the associated memory units MP1 or MP2. Subsequently each of the two microprocessor units PC1 and PC2 outputs an acknowledge signal EQ1 via the associated dedicated line L1 and L2 to the EDS communication switching system. From these acknowledge signals EQ1 the result of the aforementioned check of the received data set is evident (positive respectively negative acknowledgement signal). If the acknowledge signals EQ1 indicate that in both microprocessor units the transmitted data set was received error-free, then the EDS communication switching system concludes the transmission process with the output of a control signal ST1 to both microprocessor units PC1 and PC2. This control signal indicates that in the two microprocessor units PC1 and PC2 the data set for further processing has been received error-free. Once this control signal ST1 is issued, the data set still stored until then in the buffer memory PS of the EDS communication switching system is erased.

Referring to FIG. 3, there is shown the case in which a data set transmitted by the EDS communication switching system is received error-free by only one of the microprocessor units PC1 and PC2. This microprocessor unit may be assumed to be microprocessor unit PC1. This microprocessor unit PC1 acknowledges in the previously described manner by outputting an acknowledge signal EQ1 (positive acknowledge signal) receipt of the data set. Microprocessor unit PC2, outputs an acknowledge signal EQ2 which indicates reception with errors (negative acknowledge signal). The EDS communication switching system upon reception of this acknowledge signal EQ2 now outputs a control signal ST2 to the microprocessor unit from which previously the positive acknowledge signal had been received. In the present example that is also the microprocessor unit PC1.

Through the aforementioned control signal ST2, the microprocessor unit PC1 is informed that the transmitted data set was received error-free only by it but not by the microprocessor unit PC2. Following receipt of this control signal ST2, the microprocessor unit PC1 copies the data received by it previously and stored in memory unit MP1 and transmits this copied data set to microprocessor unit PC2, which writes this data set into memory unit MP2. For this transmission, which takes place without involving the EDS communication switching system, the aforementioned connecting line L3 (FIG. 1) is used. In the process, for example, via this connecting line L3, signal A, B, EQ1 and ST2 can be exchanged between the two microprocessor units PC1 and PC2 corresponding to the previously described signals used for the output of a data set by the EDS communication switching system. At the conclusion of this transmission, the data set previously output by the communication switching system is then available in the two memory units MP1 and MP2 for further processing.

In another embodiment of the output of a data set by the microprocessor unit PC1, one can also proceed in such a way that upon reception of control signal ST2, initially only the data set just received is written in the memory unit MP1 as a data set to be transmitted and that this memory unit MP1 can be queried through input of a service command regarding the presence of such data set.

In yet another embodiment, the EDS communication switching system, after receiving an acknowledge signal EQ2 from microprocessor unit PC2 indicating a bad transmission, sends a second transmission of the data set to microprocessor unit PC2. If the acknowledge signal from microprocessor unit PC2 once again indicates a bad transmission, then the EDS communication switching system sends a control signal ST2 to the first microprocessor unit PC1.

If such data set is present, subsequently, for example, by inputting a transmission command, a transmission can take place in the aforementioned manner via the connecting line L3 (FIG. 3). In the event that the two microprocessor units PC1 and PC2 each have at their disposal one disk drive, it is also possible by inputting the previously mentioned transmission command in the microprocessor unit PC1, to store the data set to be transmitted on disk first. The disk content can, subsequently, after placing the particular diskette into the disk drive of the microprocessor unit PC2, be written into memory unit MP2.

Regarding the transmission of a data set by the EDS communication switching system, it is pointed out that the arrival of the acknowledge signals EQ1 and EQ2 respectively output by the two microprocessor units PC1 and PC2 is checked with respect to time. To this end, the counter arrangement Z shown in FIG. 1 can be used, which counter may have two separate counter devices assigned to the microprocessor units PC1 and PC2 and controlled by a clock generator. Upon outputting a data set to the microprocessor units PC1 and PC2, these counter devices are in each instance brought from a starting state to a counting state in which they count from an initial counter state to a predetermined final counter state. This final counter state determines the maximum length of time for the arrival of the acknowledge signal. If an acknowledge signal EQ1 and EQ2 arrives before this final counter state is reached, the particular counting device is prematurely set back to its starting state. Otherwise, upon reaching the final counter state of the particular counting device, a signal is output which is evaluated by the EDS communication switching system as an acknowledge signal for data received with errors. Upon the occurrence of such a signal, the transmission processes described in conjunction with FIG. 3 proceed.

The method according to the present invention has been explained using an EDS communication switching system as an example; however the method of the invention is not limited only to such systems, but rather can, in general, be used for communication exchange systems which transmit data established for individual connections, such as for determination of fees, to an external data processing system.

We claim:

1. A method for transmitting sets of data from a communication switching system to a data processing system, said data processing system having first and second processors, communication means for allowing said first and second processors each to communicate with the switching system and intercommunication means for allowing said first and second processors to communicate with each other, said method comprising the steps of:
   sending a request signal on the communication means from the switching system to each of the first and second processors;
   sending a ready-to-receive signal on the communication means from each processor, responsive to the associated request signal, to the switching system;
   sending the same data set on the communication means from the switching system to each processor that issued a ready-to-receive signal;
   performing a transmission error check, within each processor, to determine whether the transmission of the data set by the switching system was free of errors;
   sending an acknowledge signal on the communication means from each processor to the switching system, each acknowledge signal indicating whether the transmission of the data set to the processor was free of errors;
   sending separate control signals (ST1, ST2) on the communication means from the switching system to each processor, wherein, in the event the first processor sends an acknowledge signal indicating an error-free transmission of a data set and the second processor sends an acknowledge signal indicating that a transmission of the data set was not free of errors, the switching system performs the step of sending a control signal (ST2) on the communication means to the first processor, and the first processor, responsive to the control signal (ST2), performs the step of sending the data set to the second processor over the intercommunication means.

2. A method according to claim 1, wherein the switching system includes a buffer to temporarily store data sets, and wherein the switching system further performs the steps of:
   continuously checking the buffer for the presence of a data set prior to sending the ready to send signal to the first and second processors; and
   sending the ready to send signal upon detecting the presence of a data set in the buffer.

3. A method according to claim 2, wherein the switching system further performs the step of erasing the data in the buffer after receiving an acknowledge signal indicating an error-free transmission of the data set.

4. A method according to claim 1, wherein said first processor, prior to sending a data set over the intercommunication means, further performs the step of sending a ready to send signal to the second processor over the intercommunication means, and wherein the second processor, in response, performs the step of sending a ready to receive signal to the first processor over the intercommunication means.

5. A method according to claim 1, wherein said communication means includes first and second unidirectional transmission lines for each processor, each processor sending the signals to the switching system on the first transmission line and receiving the signals and data sets from the switching system on the second transmission line.

6. A method according to claim 1, wherein said intercommunication means includes first and second transmission lines, the first processor sending a signal to the second processor over the first transmission line and the second processor sending a signal to the first processor over the second transmission line.

7. A method according to claim 1, wherein, in the event the second processor sends an acknowledge signal indicating that a transmission was not free of errors, the switching system further performs the step of repeating the transmission of the data set to the second processor, and wherein, in the event the second processor sends another acknowledge signal indicating that the repeat transmission was not free of errors, the switching system further performs the step of sending the control signal (ST2) to the first processor.

8. A method according to claim 1, wherein the switching system further performs the step of measuring the time of arrival of an acknowledge signal from each processor following the transmission of the data set, and wherein, in the event the acknowledge signal does not arrive before a predetermined length of time, the switching system further performs the step of operating as if it received an acknowledge signal indicating an error-ridden transmission.

9. A method according to claim 1, wherein the data processing system further includes first and second memory storage devices, and wherein the first and second processors perform the steps of storing data sets that are received by error-free transmissions into the first and second memory devices, respectively.

10. A method according to claim 1, wherein the data processing system further includes one memory storage device, and wherein in the event the switching system sends a control signal (ST2) to the second processor, the first processor performs the steps of storing its data set in the memory device, and marking the data set for later transmission to the second processor.

* * * * *